Sept. 25, 1962

B. C. BAIRD, SR 3,056,049

CIRCUIT FOR CONVERTING AN ANALOG QUANTITY TO A DIGITAL QUANTITY

Filed Sept. 12, 1960

2 Sheets-Sheet 1

INVENTOR.
Bruce C. Baird, Sr.
BY John V. Regan
Attorney

INVENTOR.
Bruce C. Baird, Sr.
BY John V. Regan
Attorney 3,056,049

CIRCUIT FOR CONVERTING AN ANALOG QUANTITY TO A DIGITAL QUANTITY

Bruce C. Baird, Sr., Levittown, N.J., assignor to Radio Corporation of America, a corporation of Delaware
Filed Sept. 12, 1960, Ser. No. 55,479
9 Claims. (Cl. 307—88.5)

The purpose of the present invention is to provide a circuit for converting an analog quantity such as a pulse amplitude into a digital quantity such as spaced pulses or into a time duration, that is, a pulse duration.

The circuit of the invention includes a delay line which is terminated at its receiving end in a negative resistance element such as a tunnel diode and is terminated at its sending end in an impedance which is substantially lower than the delay line impedance, for signals reflected from the tunnel diode. For example, the sending end termination may be a low impedance input circuit to the delay line or it may be an asymmetrically conducting element, such as a positive resistance diode, which is poled oppositely from the tunnel diode.

In operation, when a pulse of appropriate polarity is applied to the delay line, it passes down the line and switches the negative resistance diode from one stable state to another. The impedance of the negative resistance diode is much lower than the characteristic impedance of the delay line so that the sudden change in voltage across the tunnel diode is reflected back down the delay line in reverse polarity. The reflected voltage is now of the proper polarity to be conducted by the low impedance at the sending end of the delay line and, in view of the mismatch, is inverted and reflected back towards the receiving end of the delay line. The reflections from both ends of the delay line continue for a time dependent upon the amplitude of the input pulse. The output may be taken from across the negative resistance diode and it may consist of spaced pulses or a single pulse, depending upon the input pulse duration compared to the delay imparted by the delay line. If the input pulse duration is less than twice the delay of the delay line, spaced pulses are produced and if it is more than twice the delay of the delay line, a single pulse is produced. In the former case, the number of pulses produced is a function of the amplitude of the input pulse and in the latter case, the duration of the output pulse is a function of the amplitude of the input pulse.

Figure 1:
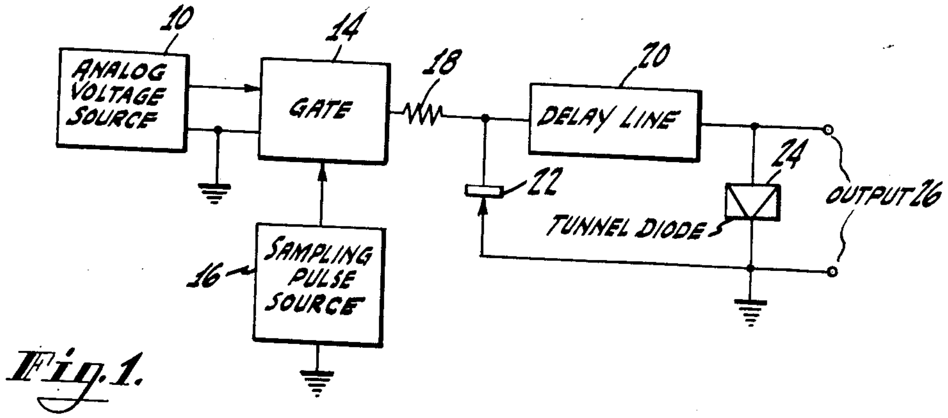

The invention is described in greater detail below and is illustrated in the following drawings of which:

FIG. 1 is a block and schematic circuit diagram of the circuit of the invention; and FIGS. 2–5 are graphs and waveforms to explain the operation of the circuit of FIG. 1.

Block 10 in FIG. 1 represents a source of an analog signal. The waveform may be as shown at 12 in FIG. 2. This signal is applied to a normally closed gate circuit 14. The second input to the gate circuit is from a sampling pulse source 16. A sampling pulse applied from source 16 to gate 14 opens the gate and permits the analog signal to pass through the gate.

The output signal from gate 14, when one is present, is applied through coupling resistor 18 to the sending end of delay line 20. A conventional positive resistance diode 22 is connected across the sending end of the delay line. A tunnel diode 24 is connected across the receiving end of the delay line. The tunnel diode is connected in opposite polarity to the conventional diode. A pair of output terminals 26 are connected across the tunnel diode 24.

The circuit of FIG. 1 operates as follows. Regularly spaced, fixed amplitude pulses are applied from sampling pulse source 16 to gate 14. These periodically open the gate and permit the analog signal from source 10 to pass to the delay line. The sampling pulse periods are shown schematically at 19 in FIG. 2. The voltage which passes through the gate during the sampling pulse period is positive-going so that it does not pass through positive resistance diode 22. This voltage has an amplitude which depends on the analog signal amplitude during the sampling pulse period.

The delay line resistance is chosen to be much higher than the tunnel diode resistance. For example, the dynamic tunnel diode resistance in its low voltage state and over the major portion of its high voltage state may be 10 or so ohms or less, depending upon the type of tunnel diode used, and the delay line resistance, 1,000 ohms or less depending upon the type of delay line used. The load line for the tunnel diode is mainly the delay line resistance and accordingly appears as a substantially constant current load line. Such a load line is indicated schematically at 34 in FIG. 3 and the intersection 36 indicates that the diode has been switched by an applied pulse to its high voltage state.

The input pulse passes down the delay line and is applied to the anode of tunnel diode 24. The pulse amplitude is assumed to be sufficient to switch the tunnel diode from an operating point in its low voltage state 26, 28 in FIG. 3 to an operating point in its high voltage state 30, 32 in FIG. 3. Also, the pulse duration is assumed to be sufficiently short to permit the tunnnel diode to return to its low voltage state before the next pulse applied to the line by the gate reaches the tunnel diode. The tunnel diode is mismatched to the line, and looks to the delay line like a relatively low resistance. The positive pulse developed across the tunnel diode when it switches from its low state to its high state to its low state is inverted in polarity and is partially reflected back down the delay line as a negative pulse.

After a length of time dependent upon the delay line length, the reflected negative pulse reaches the positive resistance diode 22. If the pulse is of sufficient amplitude, the diode 22 looks to the pulse like a low resistance and the pulse is partially reflected from the diode back through the delay line. Again, the pulse is reversed in polarity so that it reaches the tunnel diode as a positive pulse.

The process described above continues until losses in the delay line and the two diodes sufficiently attenuate the pulse to prevent further switching of the tunnel diode from its low state to its high state and further reflections.

Figure 2:
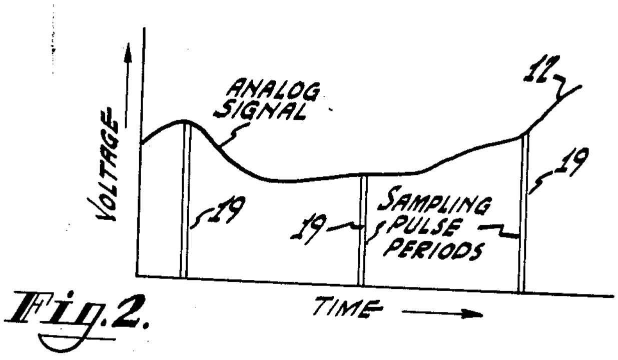
Figure 3:
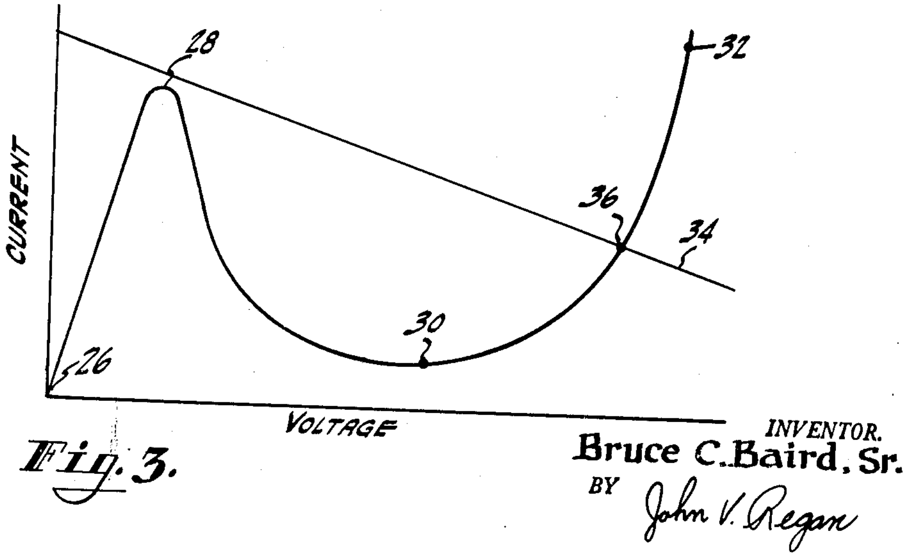

It is also possible to operate the circuit of FIG. 2 without the diode 22. However, in this case, it is necessary that the characteristic resistance of the input circuit be much lower than the characteristic resistance of the delay line. In other words, looking from the sending end of the delay line towards ground, one should see a resistance of about one-tenth or so of the delay line resistance. On the other hand, with diode 22 in the circuit, the circuit operates properly regardless of the characteristic resistance of the input circuit. The diode 22 is effectively in shunt with the input circuit and looks to the pulse transmitted toward the sending end like a low impedance.

There are two possible ways of operating the circuit of FIG. 1. In the first, the sampling pulse duration is made smaller than twice the delay line length as already discussed. In this mode of operation, spaced pulses appear at the tunnel diode. The narrow pulse traveling down toward the tunnel diode switches the tunnel diode from its low state to its high state to its low state. This pulse appears as a discrete pulse across the diode having an amplitude of perhaps 500 millivolts. During the periods between output pulses, the voltage across the diode drops to zero millivolts.

Figure 4:
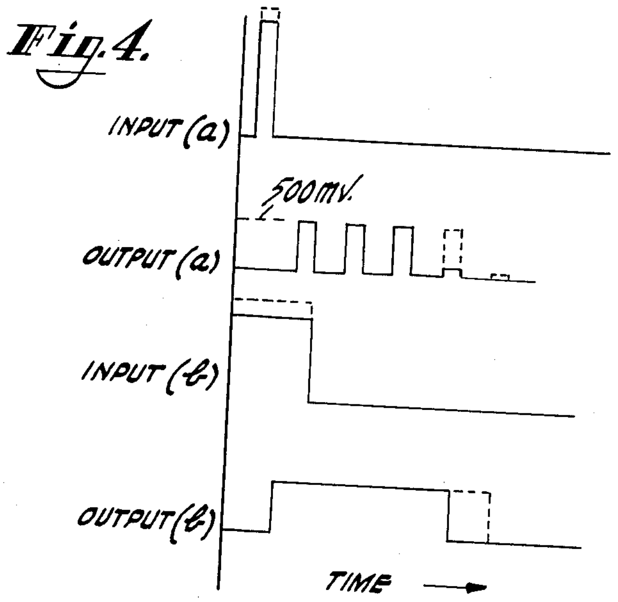

The above mode of operation is illustrated by the upper two waveforms in FIG. 4. For an input *a*, as shown by the solid curve, three output pulses *a* of about the same amplitude as one another are produced. If the input *a* is increased slightly, as indicated by the dashed line on top of the input pulse, four output pulses of about the same amplitude are obtained, as is indicated in the wave labeled "Output *a*."

In the second mode of circuit operation, the input pulse has a duration greater than twice the delay line length. In this mode of operation, multiple reflections of the leading edge of the input pulse maintain the tunnel diode in its high state. However, the length of time that this condition persists depends upon the amplitude of the input pulse. This is shown schematically in the last two waveforms of FIG. 4. Again, the dotted portion of the waveforms legended "Input *b*" and "Output *b*" indicate the effect of a larger amplitude input pulse.

In both modes of operation described above, it is desirable that the interval between sampling pulses be substantially greater than twice the delay line length so as to permit attenuation of all multiple reflections between sampling pulses.

A practical circuit according to the present invention may have the following values of circuit elements:

| | |
|---|---|
| Sample pulse repetition interval | 20,000 pulses per second. |
| Delay imparted by delay line **20** | 1 microsecond. |
| Characteristic impedance of delay line **20** | 1,000 ohms. |
| Diode **22** | 1N100. |
| Tunnel diode **24**—type RCA TD109: | |
| Peak current | 4.6 milliamperes. |
| Valley current | 0.7 milliampere. |

The above values, of course, are merely illustrative and are not to be taken as limiting.

Figure 5:
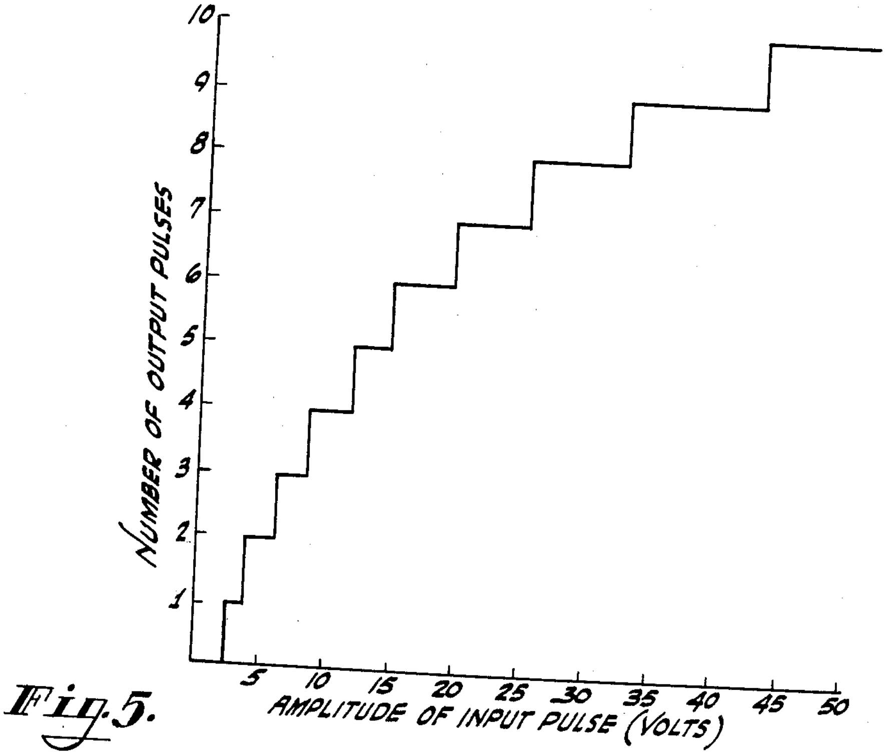

FIG. 5 shows the performance of a circuit such as shown in FIG. 1 operating with relatively narrow input pulses. The figure is believed to be self-explanatory.

What is claimed is:

1. In combination, a delay line; an asymmetrically conducting element which appears to a signal of greater than a predetermined amplitude applied to the element in the lower impedance direction of the element as an impedance of substantially lower value than the delay line impedance connected across the sending end of the delay line; and a negative resistance diode connected across the receiving end of the delay line in a sense to conduct in the forward direction a signal of opposite polarity to the signal conducted by said element.

2. In combination, a delay line; a positive resistance diode connected across the sending end of the delay line; and a tunnel diode connected across the receiving end of the delay line in opposite polarity to the positive resistance diode.

3. In combination, a delay line; a positive resistance diode connected across the sending end of the delay line; a tunnel diode connected across the receiving end of the delay line in opposite polarity to the positive resistance diode; and means for applying input pulses to the sending end of the delay line in a sense to produce forward current flow through the tunnel diode.

4. In combination, a delay line; a positive resistance diode connected across the sending end of the delay line; a tunnel diode connected across the receiving end of the delay line in opposite polarity to the positive resistance diode; and means for applying input pulses to the sending end of the delay line in a sense to produce forward current flow through the tunnel diode and spaced from one another intervals substantially greater than twice the delay of the delay line.

5. In combination, a delay line; a negative resistance diode of substantially smaller dynamic positive resistance than the characteristic resistance of the delay line terminating the receiving end of the delay line; a termination at the sending end of the delay line which looks to pulses reflected from the receiving end of the delay line like a positive resistance of substantially smaller value than the characteristic resistance of the delay line; and means for applying pulses to the sending end of the delay line in the forward direction with respect to said negative resistance diode.

6. In the combination as set forth in claim 5, said termination comprising a positive resistance diode which is poled oppositely from said negative resistance diode.

7. In the combination as set forth in claim 6, said termination comprising the internal resistance of said means for applying pulses.

8. In combination, a delay line; a termination at the sending end of the delay line having an impedance which is substantially lower than the delay line impedance; and a device having two voltage states, one at a a lower value of voltage and the other at a higher value of voltage, and having an impedance in either of said states which is substantially lower than the line impedance, connected across the receiving end of the delay line.

9. In combination, a delay line; a device having two voltage states and having a substantially smaller dynamic positive resistance in either of said states than the characteristic resistance of the delay line, terminating the receiving end of the delay line; a termination at the sending end of the delay line which looks to pulses reflected from the receiving end of the delay line like a positive resistance of substantially smaller value than the characteristic resistance of the delay line; and means for applying pulses to the sending end of the delay line in a sense to switch said device from one of its states to the other of its states.

References Cited in the file of this patent

UNITED STATES PATENTS

| | | |
|---|---|---|
| 2,707,751 | Hance | May 3, 1955 |
| 2,900,533 | Howes | Aug. 18, 1959 |
| 2,976,429 | Abbott | Mar. 21, 1961 |